March 10, 1970 R. H. HRONIK ET AL 3,500,186
APPARATUS FOR HIGH-SPEED MEASUREMENT OF TRACK GEOMETRY
Filed Dec. 26, 1968 3 Sheets-Sheet 1
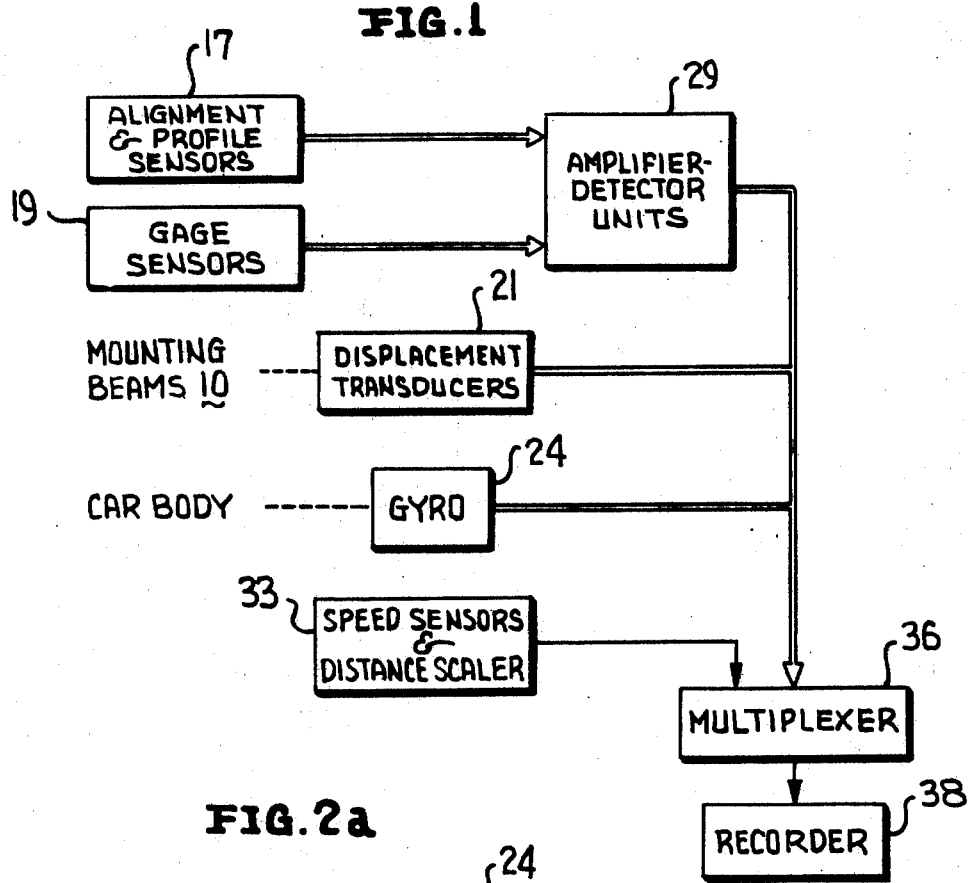
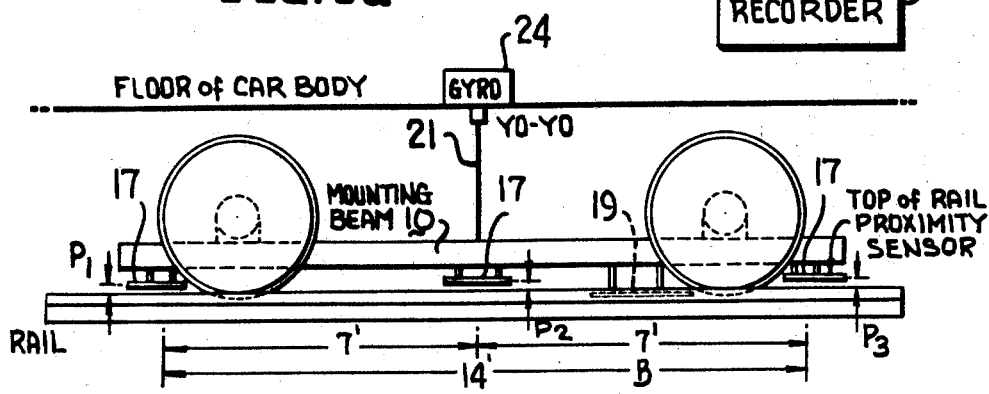
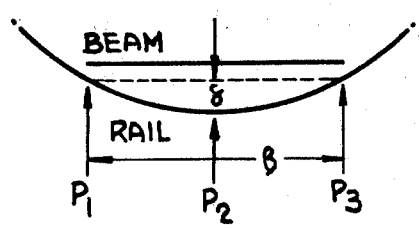
INVENTORS
RICHARD H. HRONIK,
BLANCHARD D. SMITH &
JAMES WALLEN, Jr.
BY Hurvitz, Rose & Greene
ATTORNEYS March 10, 1970 R. H. HRONIK ET AL 3,500,186
APPARATUS FOR HIGH-SPEED MEASUREMENT OF TRACK GEOMETRY
Filed Dec. 26, 1968 3 Sheets-Sheet 2
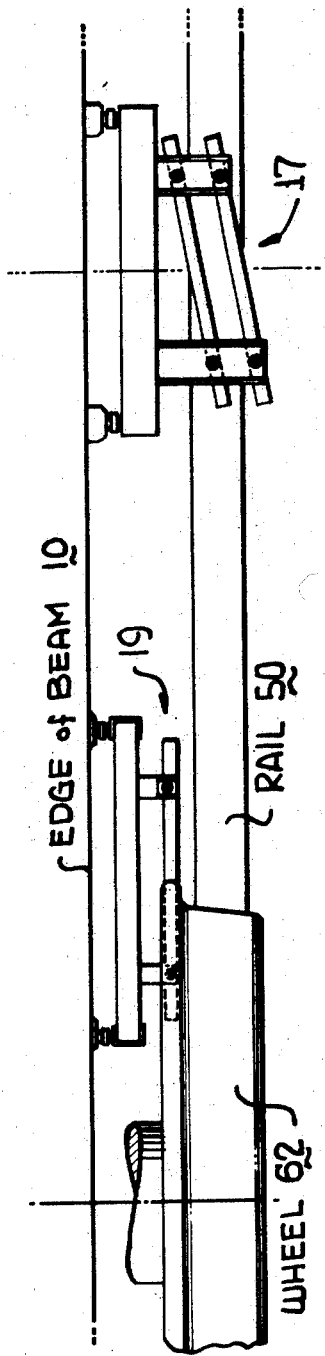
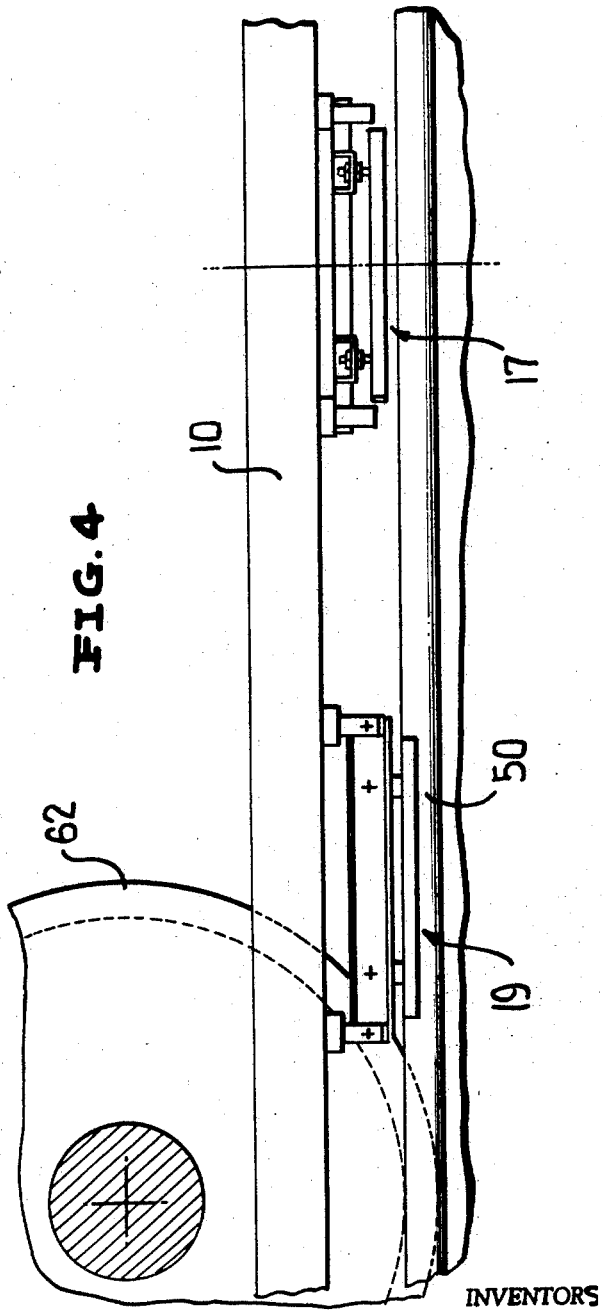
INVENTORS
RICHARD H. HRONIK,
BLANCHARD D. SMITH
& JAMES WALLEN, JR.
BY *Hurwitz, Rose & Greene*
ATTORNEYS

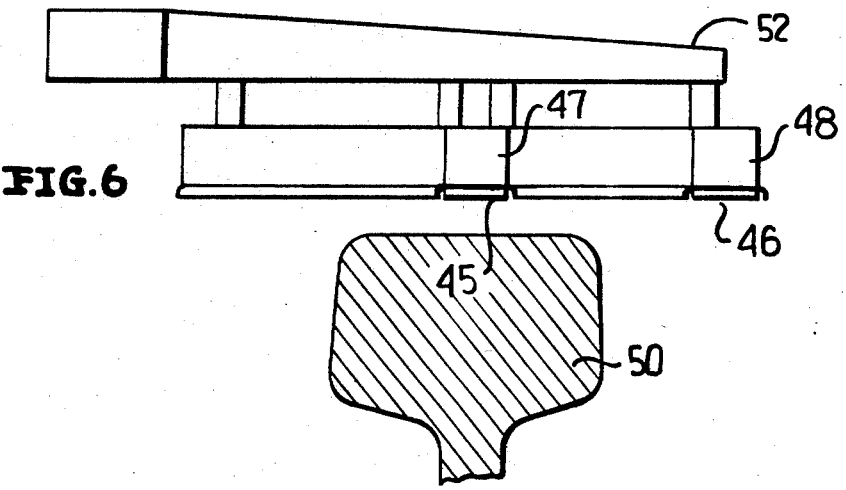
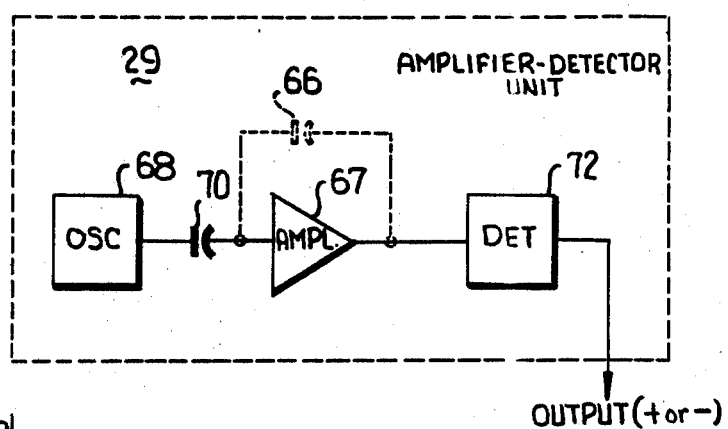
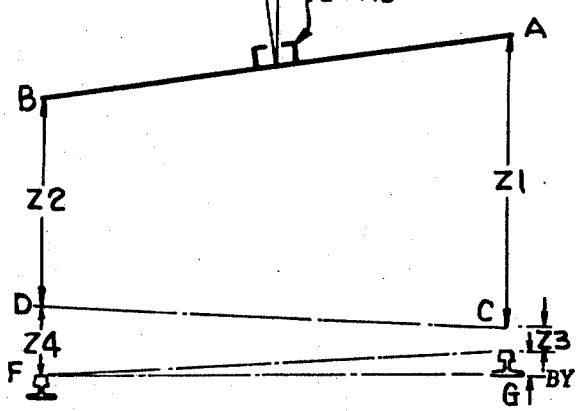

United States Patent Office 3,500,186
Patented Mar. 10, 1970

3,500,186
APPARATUS FOR HIGH-SPEED MEASUREMENT OF TRACK GEOMETRY
Richard H. Hronik, Falls Church, Blanchard D. Smith, Alexandria, and James Wallen, Jr., Annandale, Va., assignors to Melpar, Inc., Falls Church, Va., a corporation of Delaware
Filed Dec. 26, 1968, Ser. No. 787,110
Int. Cl. G01r 27/26; G01n 27/22
U.S. Cl. 324—61                4 Claims

ABSTRACT OF THE DISCLOSURE

Apparatus for use on a railway vehicle to determine track geometry as the vehicle moves along the track includes rail proximity sensors in the form of capacitive probes mounted on a rigid baseline member attached to the undercarriage of the vehicle for positioning of the probes adjacent a rail of the track. The probes are mounted along the baseline member or beam in a set of three, two at either end and one at the midpoint of the beam, above the rail, and a further probe is mounted adjacent the side of the rail, the former set used to measure profile and alignment and the latter single probe for measurement of track gauge, in conjunction with other similarly arranged probes adjacent the other rail. The profile and alignment probes lie in a plane parallel to the top of the rail but have their respective longitudinal axes oriented at an angle to the rail axis.

BACKGROUND OF THE INVENTION

The present invention relates generally to apparatus for detecting and surveying the character of a roadbed including the surface on which vehicular traffic passes, such as railway tracks or specially implemented roadways, with respect to factors such as vertical curvature and lateral cuvature, both static and dynamic. More particularly, the invention relates to such apparatus wherein measurements for determining the aforementioned factors are made using non-contacting rail proximity sensors.

In the co-pending application of James Wallen et al., Ser. No. 667,173 entitled "Track Profile and Gauge Measuring System," filed Sept. 12, 1967, and of common assignee herewith, there is disclosed apparatus for surveying of railway tracks at high speeds to obtain measurements relating to track profile, alignment, and gauge. The apparatus includes a plurality of proximity sensing devices mounted at intervals along a beam or beams attached to the car or undercarriage thereof adjacent a rail or rails, the sensors being in non-contacting relationship with the rails. In a preferred embodiment of that invention, the proximity sensing devices are probes in the form of plate-like conductive members which form, with the respective rail, the electrodes of capacitors separated at intervals along the beam, the latter of sufficient length to permit an indication of curvature, both vertical and lateral (or horizontal), along a substantial length of track compared with the normal distance between electrodes of each capacitor.

As the spacing between individual probe and its associated rail varies, the electrical capacitance between those two "electrodes" or "plates" also varies, in the well-known inverse relationship with distance and direct relationship with area, and these variations in capacitance can be measured directly or indirectly to provide the desired information to be charted along the track. Also in accordance with that invention, the measurement of capacitance is achieved in an indirect manner, the capacitor in question being employed in the feedback path of an operational amplifier whose output signal magnitude varies according to the amount of feedback, the latter directly dependent upon the instantaneous value of capacitance between probe and rail. The magnitude and polarity of the amplifier output signal, relative to a predetermined reference level, are detected and used to assembled or determine the desired information. A direct readout of the various track parameters (e.g., profile and alignment) may be provided, or the signal data obtained from each amplifier-detector channel may be sampled and recorded along with charting information, such as speed of train and mileage from originating point, by which to subsequently plot the desired parameters.

The present invention constitutes an improvement over the invention disclosed in the aforementioned Wallen et al. application. The apparatus of the present invention is primarily to be used for high speed rail research and track geometry determination, it is not limited to high speed use but may be operated at any normal rail speeds. As before, cross-level, gauge, profile, alignment, warp, and rate of change of gauge, can be measured at high speeds by the use of non-contact sensors.

SUMMARY OF THE INVENTION

According to the present invention, a rigid instrument beam securely mounted and fixed in place to the truck or bogie of the railway vehicle is used as the baseline chord employed in a midordinate-to-chord measure for determining profile and alignment. The capacitive proximity sensors are mounted in pairs at either end and at the center of the beam and in conjunction with ancillary equipment employed in the track measurements, yield a voltage proportional to their distance from the rail. By deploying the sensors at beam ends and beam center, a three-point measurement is achieved which when properly combined will yield the desired profile and alignment for a base whose length corresponds to the length of the rigid mounting beam (i.e., the length of the chord).

According to a feature of the present invention, each pair of capacitive proximity sensors is mounted on the rigid beam to be parallel to the top of the rail, but is inclined or oriented askew relative to the longitudinal axis of the rail itself such that an end of at least one element of each pair extends beyond the width of the rail top on either side thereof. Such an arrangement ensures accuracy of measurement in terms of output voltages obtained from the sensors and the ancillary equipment, irrespective of variations in track gauge and sway of the car in which the equipment is housed, for example, and tends to more accurately indicate rail variations which might otherwise be smoothed out in the readings obtained from other sensor configurations.

While rail curvature can theoretically be derived from vertical acceleration divided by velocity-squared, or from pitch-rate divided by velocity, the high-G environment associated with rail contact or wheel-bearing-mounted structures tends to obscure the desired data as well as to render such arrangements particularly vulnerable to serious damage or complete destruction as a result of the tapered wheel treads, plus any tread anomalies (for example, flats), conditions whose frequency of occurrence precludes the use of wheels as indirect vertical rail sensors. On the other hand, the use of non-contact sensors mounted along a rigid beam, in accordance with the present invention, renders. the system independent of lateral truck motion, yaw, wheel motion, wheel taper, wheel anomalies, and beam cant.

In accordance with a further aspect of the present invention, a self-erecting gyro centered over one bogie is employed to provide a vertical reference for measurement of absolute cross level, the gyro being mounted on a car floor to remove it from the hostile environment found on the bogie, and to prevent errors from being introduced through car roll, truck yaw, and lateral truck motion. Displacement transducers in the form of a polarity of spring-board, infinite-resolution linear potentiometers (yo-yo's) are employed to derive the measurements required for cross-level determination.

BRIEF DESCRIPTION OF THE DRAWINGS

The above and still further objects, features and advantages of the present invention will become apparent from a consideration of the following detailed description of a preferred embodiment thereof, especially when taken in conjunction with the accompanying drawings, in which:

FIGURE 1 is a block diagram of the overall system;

FIGURE 2(a) is a mechanical schematic of the instrumentation for measuring cross level and profile, and FIGURE 2(b) is an exaggerated line diagram of beam and rail for illustrating the nature of the profile and curvature measurements obtained with the instrumentation of FIGURE 2(a);

FIGURES 3 and 4 are fragmentary plan and side views of the mounting beam and sensors for the instrumentation of FIGURE 2(a);

FIGURE 5 is a mechanical schematic diagram of the relationship between gauge sensors and rails, taken normal to a plane through the track;

FIGURE 6 is a detailed view in section of a profile and alignment sensor relative to a rail head;

FIGURE 7 is a circuit diagram of an amplifier-detector unit of FIGURE 1; and

FIGURE 8 is a diagram useful in explaining the manner in which cross level measurements are obtained.

DESCRIPTION OF THE PREFERRED EMBODIMENT

Referring now to FIGURE 1, a block diagram is useful to indicate the general relationship of elements in the preferred embodiment. Sets of alignment and profile sensors 17 and gauge sensors 19, which, as will presently be described in greater detail, constitute rail proximity detectors, are attached to respective mounting beams 10 at either side of the car carrying the instrumentation and ancillary apparatus.

As shown more clearly in FIGURES 3 and 4, each mounting beam 10 is attached to the undercarriage, such as a truck or bogie, of the car body. The proximity sensors are attached to this rigid beam in non-contacting relationship with the respective rail at that side of the car, and are effective to provide measurements of cross-level, alignment, profile, and gauge at speeds in excess of 150 miles per hour, in a manner to be described. The length of each mounting beam 10 is limited by the underfloor constraints of the car to which it is attached and by problems of clearance. For those reasons, a fourteen foot beam was selected in actual practice in a constructed embodiment, although this length will vary from test equipment to test equipment according to the specific type of car and undercarriage involved.

The rigidity of the beam and the maintenance of its position as secured in place are important because the beam is to constitute the baseline chord for a midordinate-to-chord measure used in determining profile and alignment. It is for this reason that the car body itself is not used for profile and alignment measurements. Under some conditions it could be used as a baseline, but for maximum accuracy, such use is precluded since the car body is too flexible and would therefore tend to introduce errors into those measurements.

In order to provide accurate data as to vertical and lateral rail or track curvature, and separation of rails, the proximity sensors 17 are spaced longitudinally along the track and sensors 19 laterally thereof on mounting beams 10, as diagrammatically indicated in FIGURE 2. As attached to the undercarriage of the car, each mounting beam 10 is oriented in generally parallel relationship with the respective rail to which it is adjacent, although obviously this parallelism is not maintained exact or uniform under static or dynamic conditions unless for that location of the beam the track does not have any vertical or lateral curvature or deviation from true gauge. Non-contact proximity sensors 17 are widely spaced along the beam, in the sense that they are separated from one another by a distance much greater than the distance between the individual probe or sensor face and the rail. Sensors 19 are positioned in proximity to the interior faces of the respective rail heads 50 as shown in FIGURE 5.

In the preferred embodiment, three profile and alignment sensors 17 are mounted on each beam 10, two at or near the beam extremities in the vicinity of the wheels and the third at the center of the beam. If the rail is curved as a result of the character of the roadbed, or of the geography of the surface or terrain in the immediate vicinity of the track, or of the weight of the car applied as forces to the rails at the points of contact with the respective wheels, the spacings between individual sensors and rail will differ. The differences may be slight, but as will subsequently be observed are readily detectable from outputs obtained from the sensors, and are used to obtain the desired measurements.

As shown in FIGURES 3 and 6, each sensor 17 comprises a pair of electrodes or plates 45, 46, each of which has a shield 47, 48, respectively, to prevent the picking up of stray capacitances relative to conductive elements other than rail 50, and is attached to beam 10 by a bracket 52.

According to a feature of the present invention, sensors 17 are inclined or skewed within their horizontal plane, relative to the rail. Such an arrangement averages out those variations which are not attributable to track or track bed characteristics, such as lateral car motion or sway, while emphasizing rail defects which might otherwise be "smoothed out" (i.e., lost) in the readings obtained with other sensor configurations. In the preferred embodiment, the skew angle of the sensors relative to the rail is such that each electrode has one end located approximately centrally of the rail and the other end slightly beyond the edge of the rail, for a completely straight (i.e., uncurved) rail section. The pair of electrodes forming a single sensor 17 thus has opposite ends extending beyond the rail edge. The skewed orientation of the sensor thereby also produces greater sensitivity to lateral curvature or lateral deviations of the rail than can be obtained with sensors whose electrodes are parallel in vertical planes to the rail, i.e., than sensors which extend symmetrically throughout to either side of the rail.

Capacitance between the railhead and each plate depends in part upon vertical distance therebetween and upon extent of coverage of the upper portion of the rail surface by the plate, i.e., the area of the plate. Since the effective length of each plate is invariant, i.e., each plate consistently presents a uniform length to the rail surface as the car moves along the track, any variation in area is directly attributable and proportional to lateral shifting of the plate relative to the railhead. It may be observed, then, that the incremental variation of superposed area of the sensor throughout its length relative to rail, in the skewed configuration, renders the sensor extremely sensitive to lateral variations of the rail. Of course, both vertical and lateral rail variations may be determined with the generally horizontal orientation and vertical skewing of the rail proximity sensors, and it is for this reason that the terminology "proximity sensing" is intended to include normal and lateral (or offset) spacing between probes and rail.

It is desirable to provide sensor mounting beams 10 of 31 feet, and 19.5 feet in length for alignment and profile measurements for dimensional compatibility with accepted standards. As previously noted, however, the underfloor constraints of the typical railroad car may not admit of a rigid instrumentation base of such length, and in a constructed embodiment of the present invention a 14½ foot length was found suitable. The midordinate-to-chord deflection versus baseline lengths for various rail curvatures may be obtained by simple transposition between the actual baseline used and the accepted standard, with very little loss of accuracy resulting from the deviation in length from the standard. It can be shown, for example, that 0.125 inch deflection referred to a 31-foot alignment standard baseline corresponds to a 30-minute curve, which in turn corresponds to a 0.030 inch deflection referred to a 14½ foot instrument baseline.

The present system is independent of lateral truck motion, yaw, wheel motion, wheel taper, wheel anomalies, and beam cant. Referring to FIGURES 2(a) and (b), the midordinate-to-chord measure for a vertical profile is:

$$S = \frac{P_1 - 2P_2 + P_3}{2}$$

where all symbols are defined in the figure. The sensors cannot extend below the top of the rail because the lateral clearance required for a 14½ foot baseline is about ±1.0 inch to negotiate a 250-foot radius curve, exclusive of other tolerances. Accordingly, the alignment and profile sensor probes 17 are, as previously described, so mounted as to be suspended above the rail. The effective capacity of the rectangular probe elements to the railhead varies inversely with spacing (vertical displacement) and directly with area (lateral displacement). The electronics employed in conjunction with the sensors preferably provides an output proportional to spacing and inversely proportional to capacity.

As an example, and with reference now to FIGURE 7, the electronics may comprise an operational amplifier circuit 67 in which the probe-to-rail capacitance is so coupled as to constitute the feedback capacitance 66 of the amplifier. Input signal is applied to amplifier 67 by relatively stable oscillator 68 via capacitor 70. The oscillator generates a signal of constant amplitude at a frequency of say 50 kc./s.

The amplitude of the output signal of amplifier 67 depends primarily on only one variable, viz, the feedback capacitance, and is rectified by detector 72 to provide a D-C output voltage whose polarity indicates the direction of curvature of the track and whose magnitude represents the extent of the curvature. The D-C output voltage of the amplifier-detector unit is inversely proportional to the value of feedback capacitance. The outputs obtained for each pair of probes of the three sensors are summed to obtain an indication of vertical displacement, whereas the difference in outputs of each pair is used to derive a measure of lateral displacement.

The principal factors affecting the interpretation of alignment and profile data by use of this method are the following:

(a) The lateral deflections sensed are essentially rail-to-sensor displacements, and therefore, the midordinate-to-chord readings apply to the apparent rail, not to the inside face of the rail or the gauge point.

(b) Any variations in contour of worn rail over the 14-foot baseline will tend to exaggerate deflections. However a uniformly worn contour will have equal effect on all sensors and will not produce error in the computed alignment.

(c) Processing and correction of sensor readings are most easily and conveniently performed upon completion of a run. On-board charts of alignment and profile obtained from raw data can, however, be utilized to indicate true alignment and profile for small deflections. In the case of relatively large vertical and lateral deflections, the on-board uncorrected chart records tend to be non-linear.

Absolute cross level measurements require a vertical reference, which is readily obtained by use of a self-erecting gyro centered over one bogie. As schematically depicted in FIGURES 1 and 2(b), such a gyro 24 is most conveniently mounted on the car floor on a suitable mounting plate, rather than on the bogie or truck which would tend to provide a hostile environment. To remove errors introduced through car roll, truck yaw, and lateral truck motion, displacement transducers are employed to make the measurements required for cross level determination, as shown schematically in FIGURE 8. In that figure the line FG represents a true horizontal plane (i.e., a line of zero cross level); line FE indicates a plane of given cross level; line EG the true cross level; $Z_3$ and $Z_4$ the sensor-to-rail distances for the center set of vertical profile proximity sensors; line DC the plane of the vertical profile sensors (this plane being canted, for example, as a result of lateral truck motion); $Z_1$ and $Z_2$ represent the sensor-to-car body distances as obtained from conventional spring-loaded infinite-resolution linear potentiometers (yo-yo's) mounted between the underside of the car body and the mounting beam; line AB represents the plane of the car body floor, which may be canted because of car body roll and deviation of track from zero cross level; and $\theta$ is the angle of displacement from true verticality as determined by the gyro. The cross level, then, is $$CL = (Z_2 + Z_4) - (Z_1 + Z_3) + K \sin \theta$$

where K is a constant that relates gyro output to difference in elevation of the sides of the car.

Gauge and rate of change of gauge are measured using a pair of proximity sensors 19 adjacent respective rails of the track, one sensor on the mounting beam 10 on one side of the car and the other on the mounting beam on the other side of the car (FIGURES 2, 3, 4, and 5). To prevent damage to the gauge sensors, each is mounted behind (i.e., in the "shadow" of) a respective wheel flange relative to the direction of travel of the car down the track. Protection here is essential because switches and other wayside apparatus will be encountered, and the gauge sensors project below the top of the rail between rails of the track, a position otherwise vulnerable to such switches and other apparatus. It will be observed from FIGURE 5 that if a known rigid baseline is maintained between the sensor pair, simple addition of output signals from the gauge sensors yields the gauge measurement.

Returning now to FIGURE 1, the alignment and profile sensors 17 and gauge sensors 19 are coupled to amplifier-detector units 29 (e.g., in feedback capacitor relationship as shown in FIGURE 7) and the latter supply output signals to conventional signal conditioning apparatus 35, for adjustment of signal magnitudes relative to a reference level (for recording purposes) prior to application to a multiplexer 36 and thence to a recorder 38. Such an arrangement is necessary or desirable where several sensor channels are to provide data. Input signals to conditioner 35 are also obtained from the displacement transducers 21 between the car body and mounting beams 10, from the gyro 24 mounted on the floor of the car, and from speed sensors and distance scalers (generally designated by reference number 33). The speed sensors may be mounted on the locomotive motors themselves, and are effective to generate signal indicative of cycles-per-unit-distance, which can be recorded. In effect, the revolutions of the driven wheels are used to measure distance traveled, although distance can otherwise be obtained by reference to wayside stations, mileposts, or other datum points as either an independent measure or to correct any accumulated error in the speed sensor output.

We claim:
1. Apparatus for use on a railway vehicle having an undercarriage for transportation thereof along the rails of a railway track, said apparatus for determining dynamic track geometry, comprising;
capacitive probe means mounted to said undercarriage for variable spaced-apart non-contacting relationship with at least one of said rails when said vehicle is moving along said track, said probe means for detecting the proximity of said at least one rail relative to a preselected baseline in accordance with the capacitance between said probe means and said rail, said probe means disposed in a plane generally parallel to the top of said rail and having a longitudinal axis oriented at an angle to the longitudinal axis of said at least one rail, means for obtaining from said probe means an indication of the proximity of said rail relative to said baseline for a plurality of points along said track.

2. The invention according to claim 1 wherein said probe means comprises a plurality of probes mounted along a rigid straight beam forming said baseline, and wherein is provided further probe means mounted on said beam adjacent a side of said rail.

3. The invention according to claim 2 wherein said plurality of probes comprises a first probe and a second probe mounted at respective ends of said beam and a third probe mounted at the midpoint of said beam equidistant from said first and second probes; said first, second, and third probes separated from each other by distances far exceeding the gap between any one of them and said rail; said beam approximating the chord of an arc for any curvature of said rail.

4. A system for high-speed measurement of railway track geometry, comprising;
- a railway vehicle having an undercarriage for transporting said vehicle along a track,
- a rigid straight beam attached to said vehicle for disposition adjacent a rail of said track when said vehicle is in motion along said track,
- a plurality of elongate sensing devices mounted along said beam for detecting the proximity of said rail thereto, each of said sensing devices having a longitudinal axis skewed relative to the axis of said rail, and
- electrical means coupled to said probes for developing signal indicative of rail proximity from which track geometry may be determined.

References Cited

UNITED STATES PATENTS 2,971,154   2/1961   Lerner _____ 324—61

FOREIGN PATENTS 654,908   1/1938   Germany.

EDWARD E. KUBASIEWICZ, Primary Examiner

Dedication 3,500,186.—*Richard H. Hronik*, Falls Church, *Blanchard D. Smith*, Alexandria, and *James Wallen, Jr.*, Annandale, Va. APPARATUS FOR HIGH-SPEED MEASUREMENT OF TRACK GEOMETRY. Patent dated Mar. 10, 1970. Dedication filed Mar. 8, 1973, by the assignee, *Melpar, Inc.*

Hereby dedicates to the Public the remaining term of said patent.

[*Official Gazette October 23, 1973.*]